US008710444B2

(12) United States Patent
Kim et al.

(10) Patent No.: US 8,710,444 B2
(45) Date of Patent: Apr. 29, 2014

(54) NANOGAP DEVICE FOR FIELD ENHANCEMENT AND A SYSTEM FOR NANOPARTICLE DETECTION USING THE SAME

(75) Inventors: Dai Sik Kim, Seoul (KR); Hyeong Ryeol Park, Seoul (KR); Min Ah Seo, Seoul (KR)

(73) Assignee: SNU R&DB Foundation, Seoul (KR)

( * ) Notice: Subject to any disclaimer, the term of this patent is extended or adjusted under 35 U.S.C. 154(b) by 270 days.

(21) Appl. No.: 12/998,544

(22) PCT Filed: Nov. 27, 2008

(86) PCT No.: PCT/KR2008/006996
§ 371 (c)(1), (2), (4) Date: Apr. 29, 2011

(87) PCT Pub. No.: WO2010/050637
PCT Pub. Date: May 6, 2010

(65) Prior Publication Data

US 2011/0220799 A1 Sep. 15, 2011

(30) Foreign Application Priority Data

Oct. 31, 2008 (KR) ........................ 10-2008-0107948

(51) Int. Cl.
*G01N 21/01* (2006.01)
*B82Y 20/00* (2011.01)

(52) U.S. Cl.
USPC ........................................ 250/341.1

(58) Field of Classification Search
CPC ........................................ G01N 21/3581
USPC ........................................ 250/341.1
See application file for complete search history.

(56) References Cited

U.S. PATENT DOCUMENTS

| | | | | |
|---|---|---|---|---|
| 6,111,416 | A * | 8/2000 | Zhang et al. | 324/244.1 |
| 7,056,446 | B2 * | 6/2006 | Nagase et al. | 216/57 |
| 7,341,893 | B2 | 3/2008 | Mei et al. | |
| 7,541,227 | B2 | 6/2009 | Mei | |
| 8,211,322 | B2 * | 7/2012 | Park et al. | 216/66 |
| 2006/0275963 | A1 | 12/2006 | Mei | |
| 2007/0040491 | A1 | 2/2007 | Mei | |
| 2007/0096169 | A1 | 5/2007 | Mei | |
| 2008/0185591 | A1 | 8/2008 | Mei | |
| 2008/0302760 | A1 | 12/2008 | Park | |

FOREIGN PATENT DOCUMENTS

KR 10-0845004 7/2008

OTHER PUBLICATIONS

International Search Report for PCT/KR2008/006996, filed Nov. 27, 2008.

Kang, J.H. et al., "Perfect Transmission of THz Waves in Structured Metals", Journal of the Korean Physical Society, vol. 49, No. 3, (Sep. 2006), pp. 881-884.

Lee, J.W. et al., "Fabry-Perot effects in THz time-domain spectroscopy of plasmonic band-gap structures", Applied Physics Letters, vol. 88, (2006), pp. 071114-1-071114-3.

* cited by examiner

*Primary Examiner* — Constantine Hannaher
(74) *Attorney, Agent, or Firm* — Nixon & Vanderhye P.C.

(57) ABSTRACT

A nanogap device for field enhancement is described, which includes: a film made of an electrically conductive material; and a nanogap formed on the film and having a gap-width between a Thomas-Fermi screening length and a skin depth, the Thomas-Fermi screening length and the skin depth being determined by an electromagnetic wave and the electrically conductive material, and system for nanoparticle detection using the device.

17 Claims, 11 Drawing Sheets

NANOGAP DEVICE FOR FIELD ENHANCEMENT AND A SYSTEM FOR NANOPARTICLE DETECTION USING THE SAME

This application is the U.S. national phase of International Application No. PCT/KR2008/006996, filed 27 Nov. 2008, which designated the U.S., and claims priority to Korean Application No. 10-2008-0107948, filed 31 Oct. 2008, the entire contents of each of which are hereby incorporated by reference.

TECHNICAL FIELD

The present invention relates to a nanogap device for field enhancement and a system for nanoparticle detection using the same. More particularly, the present invention relates to a nanogap device for focusing an electric field of electromagnetic waves in terahertz and infrared ranges at a nanoscale by an approach to a metal structure that excites pseudo-plasmonics with a concept of a nano-resonance structure, and system for nanoparticle detection using the same.

BACKGROUND ART

The unique optical properties of metals are at the core of many areas of research and applications, including plasmonics, metamaterials, superlensing and sub-diffraction focusing, optical antennas, and surface enhanced Raman scattering. One important length scale inherent in metamaterials and plasmonics research activities in the microwave, terahertz, infrared, visible, and ultraviolet ranges is the skin depth of metal, which remains at the sub-micrometer level throughout the broad spectral range.

One prominent question is whether we may be able to control terahertz electromagnetic waves (hereinafter, referred to as terahertz waves) down to the nanoscale, to achieve new functionality in the sub-skin depth regime.

In general, extraordinary transmission at a metallic film with a structure of periodic aperture arrays by surface plasmons has been studied in depth in the visible range. In such structure, incident light is effectively transmitted through an aperture considerably smaller than a wavelength. In recent, the studies for the transmission property have been widened to the infrared, terahertz, and microwave ranges. Transmission resonances in these ranges are known to be related not only to a surface wave on a metallic film but also to a variety of phenomena according to the aperture structure.

The terahertz waves exhibit the transmission resonance similar to the phenomenon that has been studied in the visible range, but the principle is much different. However, understanding for the principle of the transmission resonance in the terahertz waves has been insufficient so far. The reason for recent active studies for the terahertz waves is because wavelengths of light not harmful to human beings and emitted from various cells in a human body are present in the terahertz wave range, which results in increase in applications such as medical equipments or security and monitoring systems.

DISCLOSURE

Technical Problem

An object of the present invention is to provide a nanogap device for field enhancement that focuses an electric field of electromagnetic waves, more particularly, in the terahertz and infrared ranges, on the nanogap.

Another object of the present invention is to provide a system for nanoparticle detection using the above nanogap device.

Technical Solution

In one aspect, the present invention provides a nanogap device for electric field enhancement, which includes: a film made of an electrically conductive material; and a nanogap formed on the film and having a gap-width between a Thomas-Fermi screening length and a skin depth, the Thomas-Fermi screening length and the skin depth being determined by an electromagnetic wave and the electrically conductive material.

Preferably, the electromagnetic wave has a wavelength in terahertz and infrared ranges.

Preferably, the electromagnetic wave is a single-cycle terahertz pulse.

Preferably, the conductive material is a metal or a carbon nanotube.

Preferably, the metal is gold.

Preferably, the nanogap has a shape of a rectangle or a slit.

Preferably, the film has a thickness of two times the gap-width of the nanogap.

Preferably, the nanogap has a length of a half resonant wavelength of the electromagnetic wave.

Preferably, the nanogap device is used as a launching pad for terahertz nonlinearity induction, small terahertz signal detection in astronomy, nano-particle detection, or surface enhanced Raman scattering.

In another aspect, the present invention provides a system for nanoparticle detection, which includes: an electromagnetic wave source for generating an electromagnetic wave; a film made of an electrically conductive material; a nanogap formed on the film and having a gap-width between a Thomas-Fermi screening length and a skin depth, the Thomas-Fermi screening length and the skin depth being determined by the electromagnetic wave and the electrically conductive material; and a measuring means for measuring the electromagnetic wave transmitted through the nanogap.

Preferably, the electromagnetic wave has a wavelength in terahertz and infrared ranges.

Preferably, the electromagnetic wave is a single-cycle terahertz pulse.

Preferably, the conductive material is a metal or a carbon nanotube.

Preferably, the metal is gold.

Preferably, the nanogap has a shape of a rectangle or a slit.

Preferably, the film has a thickness of two times the gap-width of the nanogap.

Preferably, the nanogap has a length of a half resonant wavelength of the electromagnetic wave.

Preferably, the measuring means measures the transmission electromagnetic wave using electro-optic sampling.

Advantageous Effects

With the nanogap device in accordance with the present invention, it is possible to find a final and primary answer for whether it is possible to achieve a light focusing in the Thomas-Fermi length range, i.e. a focusing degree of $\lambda/10{,}000$ or more, that has not been tried so far.

Also, with the nanoparticle detection system in with the present invention, it is possible to detect a tiny nanoparticle of 10 nm or less that can be hardly detected with conventional light scattering methods, and it is also possible not only to simply detect a single nanoparticle but also to find the location and orientation of the nanoparticle by deepening and practicing nanoslit-nanoparticle interaction.

BEST MODE

Hereinafter, the embodiments of the present invention will be described in detail with reference to accompanying drawings.

Embodiments of the present invention are focused on a terahertz-infrared range among wavelengths of electromagnetic waves. The reason is because this range is the wavelength range most suitable to realize the aforementioned connection of nanogap and light focusing. Since a conductive material, e.g. a metal, has a skin depth (tens nanometer) which is nearly similar to a visible range even in this wavelength range, it is possible to reduce a critical dimension with respect to a wavelength to maximally λ/10,000. This is enormous focusing degree of one hundred million times the intensity or energy of the electromagnetic wave.

Figure 1:
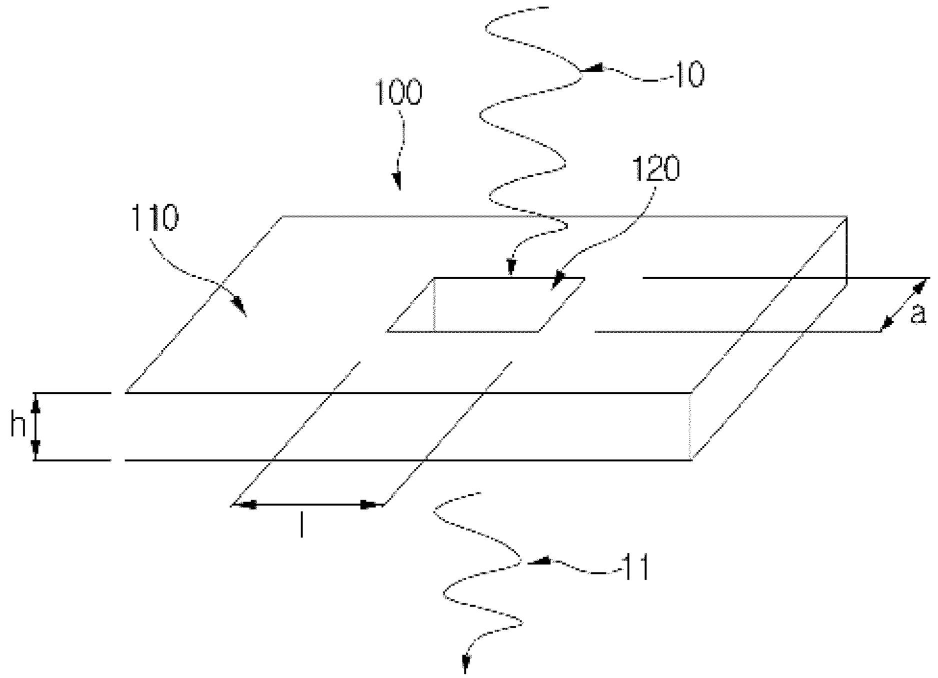
FIG. 1 is a schematic structural view illustrating a nanogap device 100 in accordance with the present invention, wherein the nanogap device 100 is formed with, on a conductive film 110, a nanogap 120 of a rectangular aperture structure having a length of 1, a width of a, and a height of h, and a transmission electromagnetic wave 11 is strongly focused in the nanogap 120 when an incidence electromagnetic wave 10 is incident on the conductive film 110 having the nanogap 120 of a rectangular aperture structure.

FIG. 1 is a schematic structural view illustrating a nanogap device 100 in accordance with the present invention. The nanogap device 100 is formed with, on a conductive film 110, a nanogap 120 of a rectangular aperture structure having a length of 1, a width of a, and a height of h. A transmission electromagnetic wave 11 is strongly focused in the nanogap 120 when an incidence electromagnetic wave 10 is incident on the conductive film 110 having the nanogap 120 of a rectangular aperture structure. The expression “strongly focused” can also be expressed by super-focusing or optical funneling.

Hereinafter, the present inventors will show that a λ/30,000 slit on metal film acts as a nanogap-capacitor charged by light-induced currents, enhancing the electric field by orders of magnitudes.

Feature sizes of metamaterials tailored for specific electric or magnetic properties in the terahertz and microwave regions are much smaller than the wavelength but are nonetheless much greater than the skin depth. Subwavelength metallic structures, in the form of apertures, can focus electric field and enhance light transmission with plasmonic, half-wavelength, or Fabry-Perot resonances. Though smaller than the wavelength, resonant focusing has been investigated at length scales far greater than the skin depth. In this regime, perfect conductor approximation has been used to describe field enhancement in one-dimensional and two-dimensional apertures, where it has been shown that the field enhancement keeps increasing with decreasing gap-widths. When the decreasing width breaks the skin depth limit and enters the new regime of sub-skin depth nanogap, would the electric field inside the gap keep increasing?

To probe field enhancement at sub-skin depth nanogaps, terahertz time domain spectroscopy is performed for a frequency range of 0.1 THz to 1.1 THz (wavelength=3 mm to 0.27 mm). It is found that the presence of the nanogap profoundly modifies transmittance which now shows resonance-lacking 1/f-type dependence. The area-normalized transmittance, equivalent to the level of field enhancement, keeps increasing with the decreasing gap width, finally reaching the value of 800 at 0.1 THz for the 70 nm gap. As the gap narrows, charges concentrate near the gap, increasing the charge density thereby enhancing the electric field. The enhanced field in the gap fully scatters towards the far-field because no cut-off exists. With the broad 1/f spectral response, a maximum $|E|^2$ enhancement of $10^5$, and a nonlinear $|E|^4$ enhancement of $10^{11}$, our nanogap device can be an excellent launching pad for terahertz nonlinearity induction, small terahertz signal detection in astronomy, nano-particle detection, and surface enhanced Raman scattering.

When an electromagnetic wave impinges on a conducting plane at normal incidence, current is induced on the surface which reflects light back, with no charge accumulating anywhere. When this plane is cut into two Sommerfeld half planes, charges accumulate at the edges with a length scale of one wavelength, so that the surface charge density has the following dependence for a small value of $x \ll \lambda$:

$$\sigma(x, t) = \frac{\varepsilon_0 E_0}{\sqrt{2}\,\pi}\sqrt{\frac{\lambda}{x}}\, e^{-i\omega t} e^{-\frac{\pi}{4} i}$$

Here, $\epsilon_0$ and $E_0$ represent the vacuum permittivity and the incident electric field, respectively, and ω and x are the angular frequency and distance from the edge, respectively. The charge singularity at x=0 for this half plane is not strong, for it disappears with integration.

Figure 2:
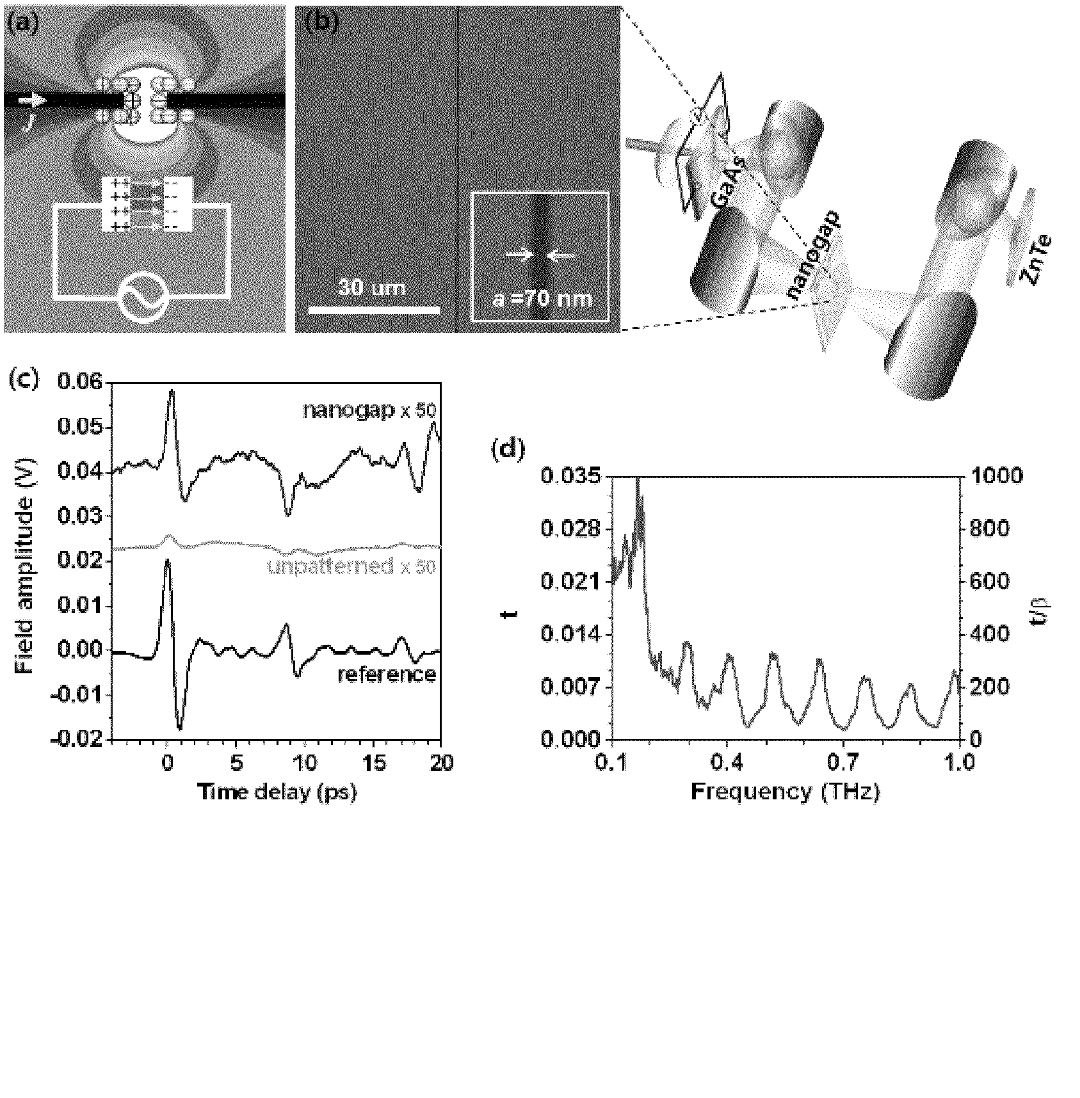
FIG. 2 is a concept of the nanogap device in accordance with an embodiment of the present invention and a time domain spectroscopy thereof, wherein 2*a* is a schematic diagram of the nanogap device corresponding to a line-capacitor driven by light-induced alternating currents; 2*b* is an SEM picture showing the geometry and dimension of the device: a 70 nm width gap perforated on gold film and a transmittance through the nanogap is measured by THz time domain spectroscopy using electro-optic sampling through a ZnTe crystal; 2*c* is an electro-optic sampling signal in time-domain, through the 70 nm gap (top), through un-patterned gold (middle), and through the 2 mm×2 mm aperture-only (reference signal; bottom); and 2*d* is a transmittance t obtained by Fourier-transform of time-domain signal, after subtracting the direct transmission through the un-patterned gold.

For a case in which the two metallic half planes are brought back together so that the charges begin to feel the pull of their opposite members across the gap, it is expected that the charges will move closer toward the edge, creating a stronger electric field. As the gap continues to close toward the sub-skin depth and below, light-induced currents will keep flowing toward the gap, which induces an even more concentrated charges at the edges (FIG. 2*a*). Although qualitative, our simple picture of an effective line-capacitor (FIG. 2*a*) driven by light-induced alternating currents already envisions that the field enhancement will keep increasing even when the gap-size becomes smaller than the skin-depth.

FIG. 2*b* depicts schematics of our experiment. The sample consists of an a=70 nm gap fabricated by using an FIB (Focused Ion Beam, FIB200, FEI) machine on h=150 nm thick gold film deposited onto 500 micron-thick Si substrate. The present inventors examine transmission through the gap by terahertz time domain spectroscopy using electro-optic sampling. A biased GaAs crystal generates a p-polarized THz wave which impinges on sample after passing through a 2 mm×2 mm aperture. A (110) oriented ZnTe crystal detects the horizontal electric field component via electro-optic sampling.

FIG. 2*c* shows the electro-optic signal through the gap sample (top), and through the un-patterned gold on Si (middle). At the bottom, the reference signal through the same aperture on the un-patterned Si (bottom) is shown. The small but non-negligible direct transmission reflects the fact that our sample thickness is of the order of the skin-depth. The contribution of this direct transmission, which is consistent with a skin depth of around 80 nm at 1 THz, needs to be subtracted when estimating the field enhancement at the gap.

Although only the light corresponding to 70 nm/2 mm, about 1/30000 should pass through the 2 mm×70 nm aperture when the terahertz waves are incident on a 2 mm×2 mm area, it is found from FIG. 2C that 1/10 of the incident electric fields pass through, which shows that actually 3000 times more electric fields are focused in the nanoslit. This phenomenon can be theoretically explained using Kirchhoff diffraction theory and Sommerfeld's half plane principle.

Fourier-transformation of time traces and dividing them by the reference signal result in frequency-dependent transmission spectra. Shown in FIG. 2*d* is the transmission spectrum through the gap, after subtracting the direct transmission through un-patterned gold. While the spectrum is somewhat complicated owing to the Fabry-Perot type multiple reflection also apparent in time-traces, transmittance of around 1% is much larger than the gap coverage β=α/2 mm, which is only 0.0035%=70 nm/2 mm. This enhanced transmission originates from the enhanced field at the gap, and the area normalized transmittance t/β displayed on the right side, translates into the horizontal electric field enhancement at the gap through the Kirchhoff integral formalism.

Figure 3:
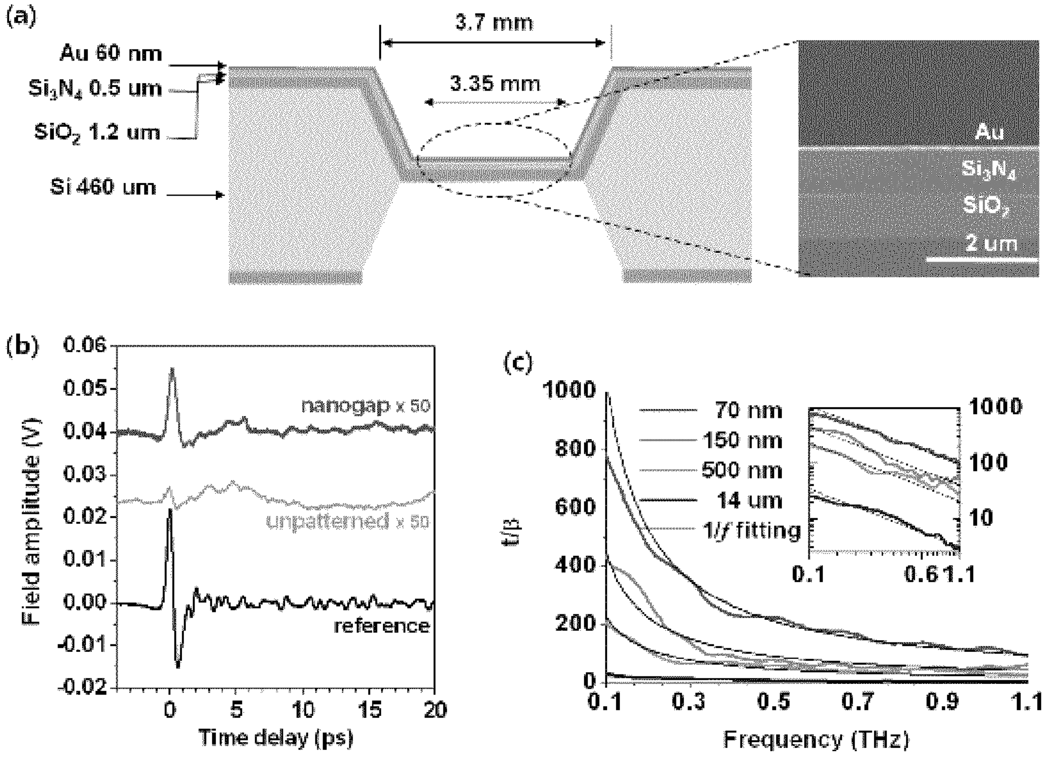
FIG. 3 is a terahertz time domain spectroscopy through nearly-free standing nanogaps, wherein 3*a* is a cross-sectional view of the sample structure before FIB processing of the nanogap, and to the right is an SEM image of an enlarged area; 3*b* is an electro-optic sampling signal in time-domain, through the 70 nm gap (top), through unpatterned gold (middle), and through the 2 mm×2 mm aperture-only (reference signal; bottom); and 3*c* is an area-normalized transmittance through samples with a=70 nm, 150 nm, 500 nm, and 14 μm. The fits (black lines) indicate 1/f dependence [Inserted: Log-log plot of the area-normalized transmittance].

The field enhancement implied in FIG. 2*d* for the nano-gap is one-to-two orders of magnitudes larger than those in micron- and millimeter-sized gaps in terahertz and microwave ranges where field enhancement of the order of ten was observed. To accurately measure the field enhancement at the nanogap and its frequency dependence, we need to eliminate the Fabry-Perot effect of the Si substrate. FIG. 3 shows the constructions and experiment results of a sample of nanogap device of the present invention. A nearly free-standing nanogap was fabricated on 60 nm-thick gold film deposited onto a 1.2 μm layer of $SiO_2$ followed by a 0.5 μm thick layer of SiN (FIG. 3*a*). Transmitted signal in time-domain through this nanogap is shown in FIG. 3*b* (top), together with that for the un-patterned gold (middle) and the reference signal (bottom): multiple reflections are not seen.

Shown in FIG. 3 (*c*) are field enhancement spectra through three nanogaps, a=70 nm (h=60 nm), 150 nm (h=150 nm), and 500 nm (h=60 nm), again after subtracting the direct transmission. For comparison, area normalized transmission through a=14 μm sample with h=17 μm is shown (lower line). Displayed in the inset are the log-log plots of the frequency dependent field enhancement for the four samples. The field enhancement keeps increasing with decreasing frequency, evidencing a 1/f-type frequency dependence denoted. We also note that the field enhancement for the 14-micron gap sample is at best 10 even at the lowest frequency where the enhancement is the largest, consistent with earlier works (J. W. Lee, M. A. Seo, D. H. Kang, K. S. Khim, S. C. Jeoung, and D. S. Kim, "Terahertz electromagnetic wave transmission through random arrays of single rectangular holes and slits in thin metallic sheets," Phys. Rev. Lett. 99, 137401 (2007)). The enhancement is the largest for the smallest sub-skin depth gap size a=70 nm, reaching the unprecedented value of 800 at 0.1 THz.

The resonance-lacking 1/f frequency dependence of the field enhancement implies a capacitor-like charging of the gap by an alternating current source, where the electric field is proportional to the charging time and therefore to 1/f. Since the nanogap device parameters, the film thickness h and width a, are in the range of the skin depth or smaller, perfect conductor assumption normally used for terahertz metamaterials does not apply. For a better understanding and optimization of our gap device, two-dimensional FDTD (Finite Difference Time Domain) analysis was carried out. It is important to note that, regarding the problem of extending the size from the cm scale (sample dimension) down to nm (metal grid) ranges, asymptotically varying grid sizes were employed. A 2.5 nm grid size is used inside the metal and at the gap, and this grid gradually becomes larger as the process shifts away from the metal/gap region, all the way up to 25 an for air. Convergence was tested to confirm a field amplitude error of less than 2% for these grid size control settings and over the total simulation space (10 mm×2.5 mm). Within the frequency range of interest, the Drude model was adopted for the calculation of the dielectric parameters of the metal (gold). Notably, the skin depth at 0.1 THz is 250 nm, clearly larger than the 70 nm gap width or the 60 nm film thickness.

FIG. 4*a* shows the horizontal electric field pattern obtained from the numerical analysis at 0.1 THz (wavelength 3 mm), zoomed in for an area of 700 nm×700 nm with a 500 nm gap sample (h=60 nm). The field enhancement at the gap is approximately 200 relative to the incident one. We now narrow the gap to 70 nm, as shown in FIG. 4*b*. The field enhancement is much stronger here than with a 500 nm gap; it is more than 1000 at its maximum. This theoretical prediction of an increasing field enhancement with a decreasing gap beyond the skin depth regime is consistent with the simple concept here of charges concentrating towards the gap region as the gap closes. It is also in good agreement with the experimentally obtained field enhancement of 800. It is interesting to note that the field is completely concentrated at the gap without penetrating into the metal, even though the gap size 70 nm is much smaller than the skin depth of 250 nm. This is because the horizontal electric field at the gap is normal to the gap wall, at which point it is terminated by surface charges. The vertical electric field shown in FIG. 4*c* is concentrated on the immediate vicinity of the gap and is terminated by surface charges on metal plane. The size of the surface charge-spread is close to the gap-width, consistent with our picture that charges move closer and closer to the edges as the gap narrows, most likely due to the attraction of opposite charges.

In stark contrast to the strong horizontal electric field that is focused on the gap region, the magnetic field Hy (FIG. 4*d*) is much more spread out with essentially no enhancement. It penetrates deeply into the metallic region consistent with the skin depth. FIG. 4*e* shows the $E_x$ and $H_y$ fields calculated at an effective distance of 2.5 nm above the exit plane plotted in logarithmic scale. While the magnetic field stays mostly constant in this length-scale, the horizontal electric field at the gap is orders of magnitudes stronger than the magnetic field. Once we move away from center of the gap into the top of the metallic surface, the electric field becomes weaker than the magnetic field. To see the energy flow through the nanogap, we plot the time-averaged Poynting vector $\langle S_z \rangle$ (FIG. 4*f*) where concentration of light energy at the sub-skin depth gap is apparent.

Figure 4:
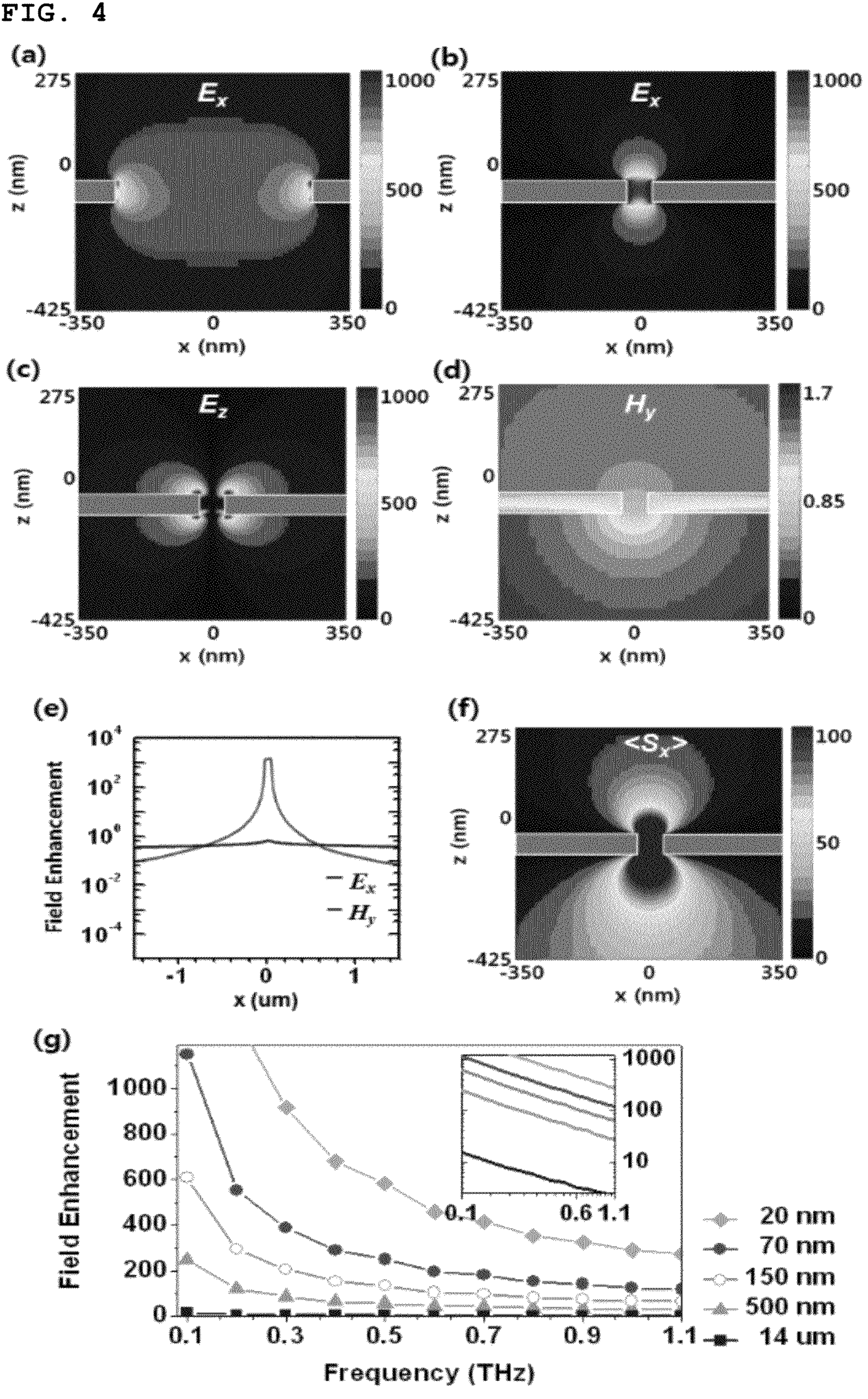
FIG. 4 is a FDTD simulation of fields around nanogaps, wherein 4*a* shows a simulated horizontal electric field around a 500 nm gap with an area size of 70 nm by 700 nm at 0.1 THz; 4*b* shows a horizontal electric field around a 70 nm gap; 4*c* shows a vertical electric field around the 70 nm gap; 4*d* shows a simulated magnetic field around the 70 nm gap; 4*e* shows a cross-sectional plot of the horizontal electric and magnetic fields at the exit side; 4*f* shows a Time-averaged Poynting vector component $\langle S_x \rangle$; and 4*g* shows a frequency-dependent horizontal electric field at the exit-plane measured mid-gap for gap widths of 20 nm, 70 nm, 150 nm, 500 nm, and 14 μm, respectively.

Then, the frequency- and width-dependence of the electric field at the gap, shown in FIG. 4(*g*), reproduce the experimentally observed area-normalized transmittance/field enhancement well, quantitatively as well as qualitatively, including the 1/f-type dependence and the increasing enhancement with decreasing a. The film thickness was fixed at 60 nm for a=70 nm and a=500 nm, at h=150 nm for a=150 nm, and at h=17 μm sample with a=14 μm. In simulation, a gap size 20 nm is also considered, to probe the possibility of enhancing the device performance with smaller gap width. Indeed, larger enhancement is seen with the 20 nm gap, still maintaining the 1/f dependence indicating that our scheme would work for even smaller gap sizes. Analyzing the current distribution inside the conductor and the surface charge distribution near the gap shows that while the current distribution is nearly frequency-independent apart from the trivial $e^{-i\omega t}$ dependence, the surface charges at the gap contain the necessary 1/f term. This dependence, which is universal in any capacitor problem with an alternating current source, is therefore consistent with the magnetic field-induced, harmonically oscillating currents charging the nanogap, with the charging time inversely proportional to the driving frequency.

Figure 5:
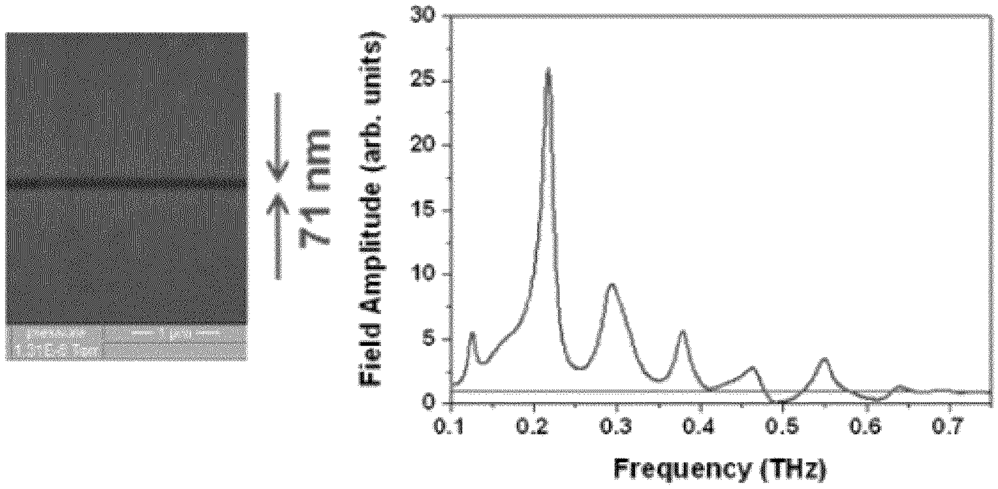
FIG. 5 shows an example of a nanogap device with a single structured rectangular aperture and a test result thereof, wherein to the left of FIG. 5 is shown the example of the nanogap device with a rectangular aperture having a length (horizontal length) of 300 μm and a width (vertical length) of about 71 nm; as can be seen from the right of the FIG. 5, light with a wavelength of two times the length of the gap is absorbed most due to the antenna principle; also, electric fields are concentrated more in the aperture with decreasing gap-widths by the same principle as in the single structured slit; and the picture in the right of the FIG. 5 shows magnitudes of the transmission waves according to frequencies.

Next, a transmission resonance effect for the nanogap device (single rectangular aperture structure) will be discussed. As shown in FIG. 5, a rectangular aperture is 300 μm in length (horizontal length) and about 71 nm in width (vertical length). Due to the antenna principle, light with a wavelength of two times the length of the gap is absorbed most. Also, electric fields are concentrated more in the aperture with decreasing gap-widths by the same principle as in the single structured slit.

The picture in the right side of the FIG. 5 shows magnitudes of the transmission waves according to frequencies. It is seen that the electric fields pass through the most at around 0.2 THz, but since a resonance frequency is actually smaller than the actual resonance frequency because of a refractive index of a substrate, the resonance frequency is 0.5 THz when considering the refractive index of the substrate, 2.5. Herein, the resonance frequency refers to a range of frequencies transmitted most when light of various frequencies is transmitted through the metal film. It is seen that a wavelength of 0.5 THz light is 600 μm, two times the width of the rectangular gap. A relative magnitude of the light transmitted at the resonance frequency range is 25, and it could be found from past experiments that the relative magnitude of the transmitted light is decreased with the increasing gap-width.

Figure 6:
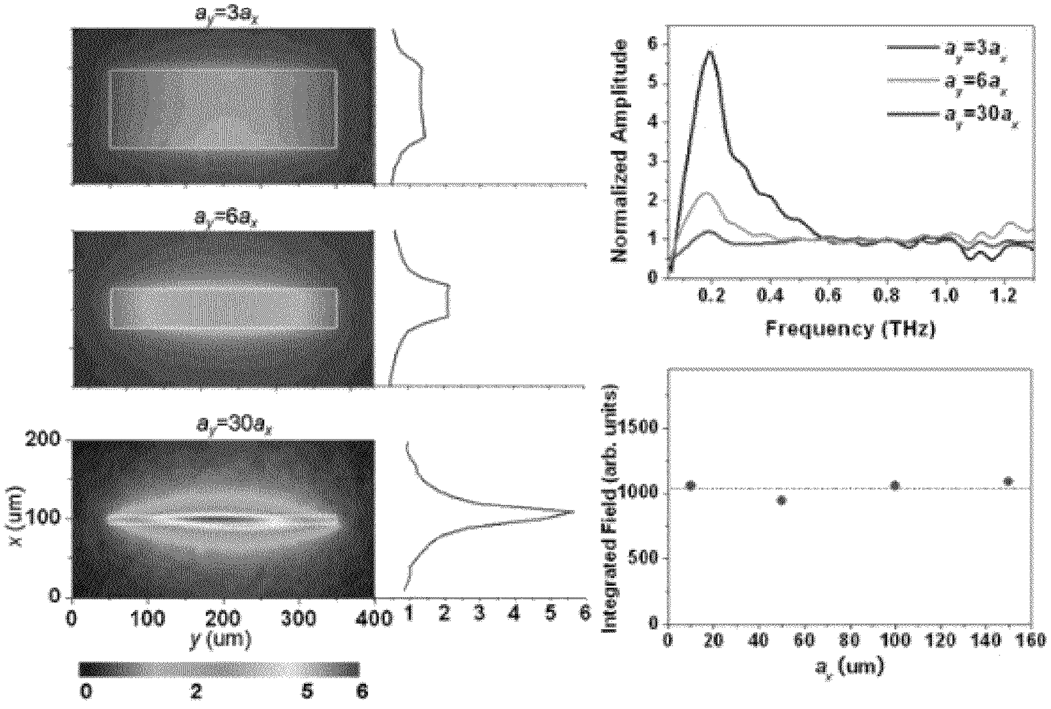
FIG. 6 is shows properties of a transmission wave according to variation in a width of an aperture (gap) in a single rectangular aperture structure, wherein a magnitude around the rectangular aperture is shown with the length of the rectangular aperture being fixed to 300 μm and the width varying 100 μm, 50 μm and 10 μm; it can be appreciated from FIG. 6 that electric fields are focused more strongly and concentrated most in the middle of the aperture as the width is decreased; a relative magnitude of the transmitted electric field is shown and it can be seen that magnitudes of 1, 2 and 6 are resulted at 100 μm, 50 μm and 10 μm, respectively; and it can be appreciated that these are smaller than the aforementioned nanoscale rectangular aperture and explain well the transmission resonance effect on the aforementioned variation in the width.

From this result, it can be appreciated that a tiny rectangular aperture having a length of a half of the wavelength of the transmission wave and a nano-scale width can be considered as a nanogap half-wavelength antenna and can be used to strongly focus electric fields in the gap (see FIG. 6).

As described above, since a geometry of the nanogap structure itself determines the light focusing degree, it is possible to increase an energy focusing degree by decreasing the width (critical dimension) of the nanogap structure. For example, for a case of a nanoslit structure, the resonance wavelength is determined only by a length not by the thickness or width of the nanogap structure, the resonance property is not changed even though the thickness and width of the nanogap structure are decreased to the skin depth of the electromagnetic waves that correspond to the resonance frequencies.

As evidenced by these findings, as millimeter waves can concentrate onto a nanogap smaller than the skin depth, it should be possible to enhance the electric field further by closing the gap some more. The ultimate gap size may be determined at the charge-screening length scale of metal, which is the Thomas-Fermi screening length typically below 1 nm. Focusing of millimeter-wavelength light at the nanometer scale and below could result in field enhancement of some 10,000, which would find applications in, for instance, terahertz nonlinearity. Even with the present gap size, which enables field enhancement of one thousand, it should be possible to reach the field amplitude of 1~10 kV/cm necessary to induce nonlinearity at semiconductor nano-structures without using amplification stages or using only continuous-wave sources such as Gunn diodes. It should also be possible, as we can obtain a field enhancement of nearly three orders of magnitudes without resonance, to increase it even further with resonance such as found in half-wavelength antenna. With such a design, the use of terahertz radiation to detect nano-particles inside nanogaps, or to detect the existence of a bridge become feasible.

In conclusion, we showed that a λ/30,000 nanogap focuses terahertz electromagnetic waves with wavelengths in the range of millimeters, resulting in enormous field enhancement. Metallic nanostructures tailored for terahertz operations would find wide ranging applications as sub-skin depth field enhancing and focusing device, and as an enabling structure for sub-nanometer optics in the Thomas-Fermi length scale.

In the present invention, the nanogap structure having such properties was experimented in various combinations using an FIB, and a measuring system for nanoparticle detection, further a ultra sensitive nanoparticle sensor (for sensing location, orientation and size), i.e. a measuring equipment for nanoparticle detection is developed using phenomena measured here.

Like a visible plasmonics, pseudo-plasmonics formed in the nanogap (nanoslit) react to variation in partial dielectric condition (presence of nanoparticle, variation in dielectric constant and so on) in the vicinity of the nanogap structure. However, in an infrared-terahertz range, it was possible, since attenuation is smaller than in the visible plasmonics, to study various interesting interactions between nanogap structures that are not revealed in the studies for the visible plasmonics. Particularly in the present invention, influence of the spatial interaction between the nanogap (nanoslit) and the nanoparticle on plasmonic resonance condition, phase variation, and intensity of the light focusing degree was variously studied.

When a metal nanoparticle is placed on a surface of the nanoslit under the resonance condition, distributions of partial currents and charges are influenced. We have performed experimental and theoretical study how this partial interference has an influence on entire intensity of light transmission, resonance frequency, phase, light focusing degree of the nanoslit. Particularly interested herein is how the resonance spectra vary with size, shape and location/orientation on the slit of the absorbed nanoparticle. In addition, we also have performed experimental and theoretical study whether it is possible to find inversely the location of the nanoparticle from the resonance spectra.

The aforementioned studies for the interaction between the nanoslit and the nanoparticle not only has the scientific value but also can be utilized in detection of a tiny nanoparticle. The tiny nanoparticle of 10 ran or less can be hardly detected with conventional light scattering methods. The present invention seeks a method not only simply detecting a single nanoparticle but also capable of finding the location and orientation of the nanoparticle by deepening and practicing the nanoslit-nanoparticle interaction.

Figure 7:
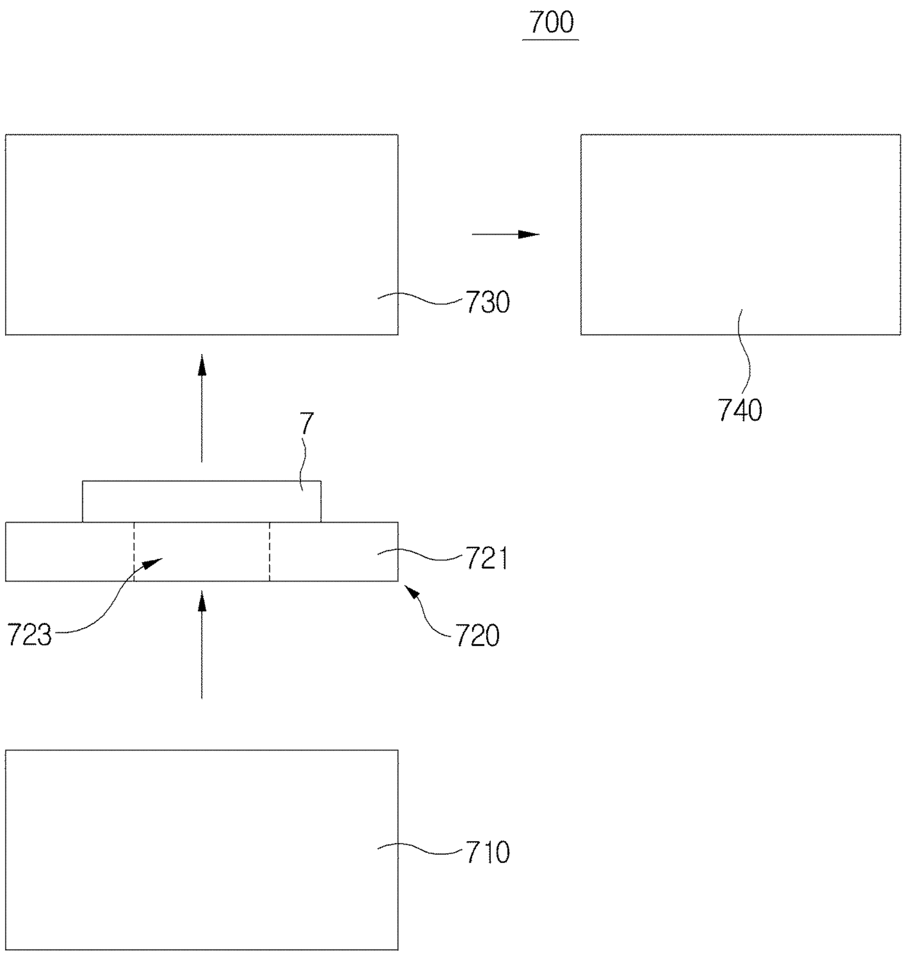
FIG. 7 is a structural view of a system for nanoparticle detection in accordance with the present invention.

FIG. 7 is a conceptual view of a system for nanoparticle detection in accordance with the present invention. The nanoparticle detection system 700 in accordance with the present invention includes: an electromagnetic wave source 710 for generating an electromagnetic wave; a film 721 made of an electrically conductive material; a nanogap 723 formed on the film 721 and having a gap-width between a Thomas-Fermi screening length and a skin depth, which is determined by the electromagnetic wave and the electrically conductive material; and an analyzing means 730 for measuring the electromagnetic wave transmitted through the nanogap and comparing and analyzing the electromagnetic wave with a previously measured reference signal.

Specific configuration and operation principle of the nanoparticle detection system 700 in accordance with the present invention will be described. The present inventors employ preferably a terahertz generator as the electromagnetic wave source 710. The nanogap device 720 including the film 721 and the nanogap 723 is the same as that described above. Preferably, the measuring means 730 includes an electro-optic sampling device. When a nanoscale particle 7 is placed on the nanogap 723 and an electromagnetic wave (terahertz wave) is then transmitted through the nanogap 723 from the lower side to the upper side, measurement for the transmitted electromagnetic wave (terahertz wave) is made at the upper side.

To study transmission spectrum properties in the terahertz range, a terahertz time domain spectroscopy is used. A femtosecond laser (80 MHz repetition rate, 150 fs pulse width, 780 nm wavelength) is split into two pulse lasers, which are directed in two directions to the electromagnetic wave source 710 and the measuring means 730, respectively. The first pulse laser generates a terahertz wave in the electromagnetic wave source 710, and the terahertz wave after transmitted through a sample is focused on a measuring crystal of the measuring means 730. At this same time, the second pulse (probe pulse) previously split simultaneously with the first pulse is focused on the measuring crystal of the measuring means 730, an intensity of the terahertz wave at each time (50 fs interval) is time-swept by a time difference between the two pulses.

Figure 8:
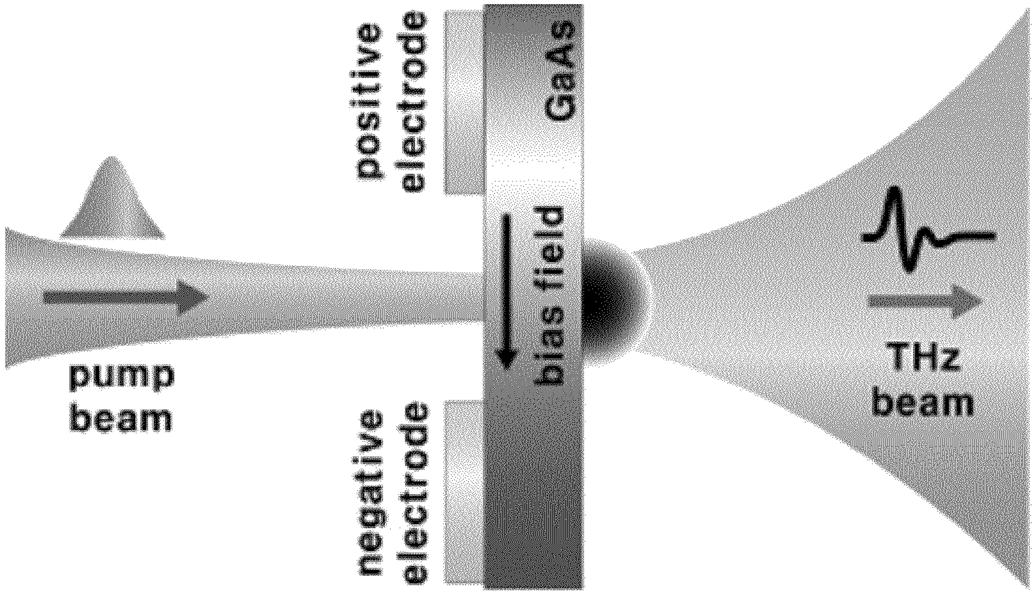
FIG. 8 is a concept view of a terahertz wave generator that can be used in the present invention.

As shown in FIG. 8, the first pulse laser is incident to a GaAs semiconductor crystal as the terahertz generator to excite electrons to energy level over the band gap. At this time, a bias of about 150 V is applied to accelerate the exited electrons in on direction, and the accelerated electrons generate electromagnetic waves with frequencies of several terahertz (antenna effect).

As described above, a first of the laser pulses split in two directions generates the terahertz waves and this terahertz waves are focused on the surface of the measuring crystal of the measuring means 730. The second pulse (probe pulse) is focused on the measuring crystal of the measuring means 730 together with the terahertz waves, and the probe pulse detects variation in the refractive index of the crystal modified by the terahertz waves. The variation in the refractive index of the crystal is in proportion to the intensity of the incident terahertz waves, and this direct proportion relationship between electric fields and the refractive index of the crystal is also referred to as Pockels effect.

Figure 9:
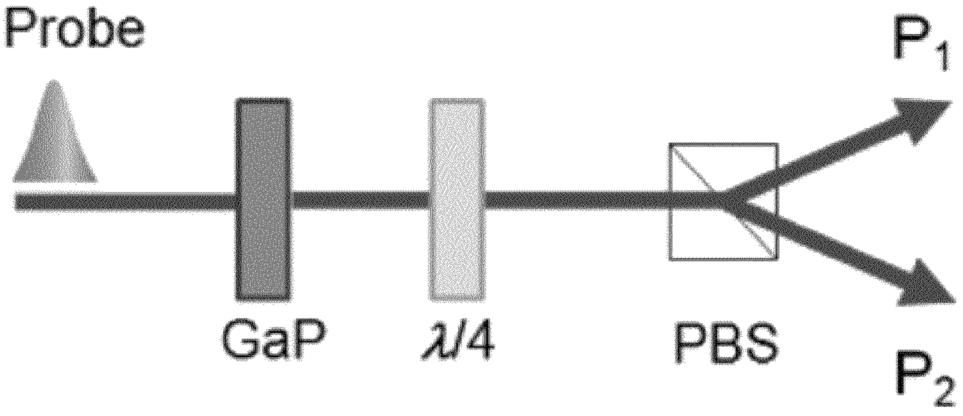
FIG. 9 is a concept view of an electric-optic sampling device that can be used in the present invention.

As shown in FIG. 9, the probe pulse is focused on the surface of the semiconductor crystal of GaP (or ZnTe). This probe pulse is linearly polarized and this linear polarized pulse rotates, orthogonal to an optical axis of the crystal, by an azimuthal angle proportional to the field amplitude of the terahertz wave. This linearly polarized probe pulse with slightly rotated angle compared to the beginning is transformed into an elliptical polarized pulse while passing through a quarter wave plate and is then split into horizontal and vertical components, which enter in two photodiodes, respectively, by a Wollastone prism or a polarizer beam splitter (PBS). Since an intensity difference in the probe pulses entered in the photodiodes is in direct proportion to the intensity of the initial terahertz wave, it is possible to found inversely the intensity of the terahertz wave by measuring difference between the probe lights entered in the photodiodes. At this time, it is possible to measure the intensity of the terahertz wave at each time when a time delay between the two laser pulses is given, and this is the basic principle of the THz time domain spectroscopy. Finally obtained terahertz wave data is transmitted field amplitude on a time axis, and plus and minus signs mean the phases of the generated terahertz waves.

As described above, the measured terahertz wave data is expressed by the intensities on the time axis, and the following is Fourier transform thereof.

The functions X=fft(x) and x=ifft(X) implement the transform and inverse transform pair given for vectors of length N by:

$$X(k) = \sum_{j=1}^{N} x(j)\omega_N^{(j-1)(k-1)}$$

$$x(j) = (1/N)\sum_{k=1}^{N} X(k)\omega_N^{-(j-1)(k-1)}$$

where, $$\omega_N = e^{(-2\pi i)/N}.$$

Figure 10:
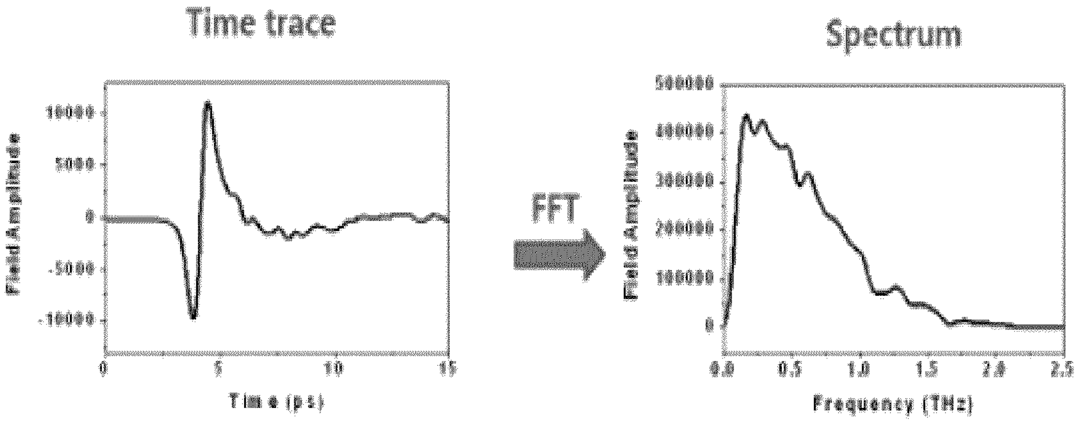
FIG. 10 is a graph by terahertz wave data expressed by measured intensity on a time axis and a graph by data on frequencies transformed by a Fourier transformation.

As shown in FIG. 10, the terahertz wave data expressed by the intensities on the time axis can be transformed into data on frequencies by the aforementioned Fourier transformation.

Figure 11:
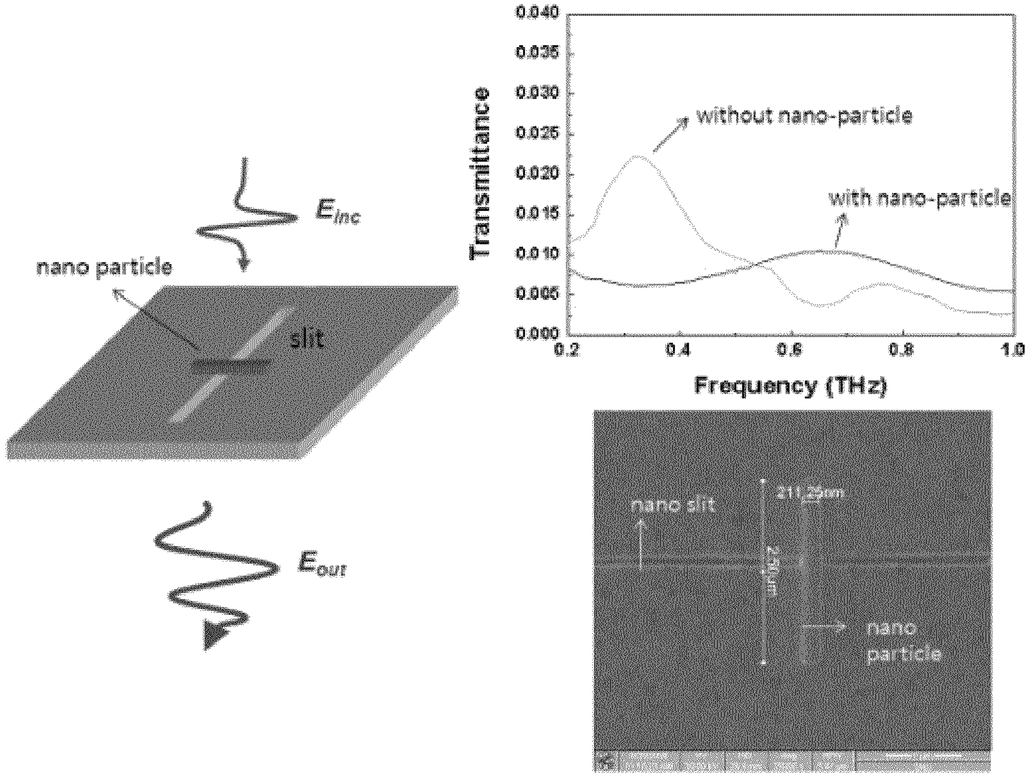
FIG. 11 is a conceptual view of a study for interaction between a nanoslit (nanogap) and a nanoparticle in the system for nanoparticle detection, wherein when a nanoscale particle is placed on the nanoslit and a light is then transmitted through the nanoslit from the upper side to the lower side, analysis for the transmitted light is made at the lower side; depending on presence or non-presence of the nanoparticle, results shown in the right side graph are obtained; a labelled solid line in the right graph shows relative intensity of transmission waves to incidence waves according to wavelengths measured without the nanoparticle, and a labelled solid line shows that measured with the nanoparticle; as can be seen the results, a peak is located at different frequencies depending on presence or non-presence of the nanoparticle; this characteristic can be applied to found presence and location of the nanoparticle

FIG. 11 is a conceptual view of a study for interaction between a nanoslit (nanogap) and a nanoparticle in the system for nanoparticle detection. When a nanoscale particle is placed on the nanoslit and a light is then transmitted through the nanoslit from the lower side to the upper side, analysis for the transmitted light is made at the upper side. Depending on presence or non-presence of the nanoparticle, results shown in the right side graph are obtained. A labelled solid line in the right graph shows relative intensity of transmission waves to incidence waves according to wavelengths measured without the nanoparticle, and a labelled solid line shows that measured with the nanoparticle. As can be seen the results, a peak is located at different frequencies depending on presence or non-presence of the nanoparticle. This characteristic can be applied to found presence and location of the nanoparticle.

For example, the nanoparticle detection system is feasible largely in two types: a first is the nanoparticle detection system in a single slit structure, and a second is the nanoparticle detection system in single rectangular aperture structure. The two systems are slightly different in operation principle, but have the function capable of measuring light scattered by incidence of the terahertz wave on the nanoparticle. Difference is that the nanoparticle detection system in single rectangular aperture structure can selectively measure the light with a specific frequency, i.e. the resonance frequency. Also, the two types of the nanoparticle detection system have an advantage that they allow a nanoscale measuring device although the terahertz wave has a wavelength longer than that of the light in the visible range.

Experimental Methods

1. Fabrication of Nanogap Device

A 60 nm thick nearly free standing gold film is fabricated by using the photolithography (FIG. 3*a*). The silicon substrate was first coated with two photo-resist strips and the facet of this pattern was processed using chemical etching. After thermal wet oxidation and back-side etching leaving 50 μm silicon, the substrate is nitride deposited. One more back side etching is performed to reduce the total film thickness down to 1.7 μm. Gold film is deposited, after which focused ion beam (FIB) milling was used to define the gap structure.

2. THz Time-Domain Measurement

We use a single-cycle terahertz source generated from a 2 kV/cm biased semi-insulating GaAs emitter impinged upon by femtosecond Ti:Sapphire laser pulse train with wavelength 780 nm, 76 MHz repetition rate and 150 fs pulse width. Electro-optic sampling method is used to detect the transmitted THz waves in time-domain where an optical probe pulse undergoes a slight polarization rotation by the synchronized terahertz beam in a (110) oriented ZnTe crystal, detecting the horizontal electric field. THz waves impinge on sample after passing through a 2 mm×2 mm aperture. The incident beam through the aperture without sample is used as a reference signal to obtain transmittance through the nanogap.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

INDUSTRIAL APPLICABILITY

When the nanogap device in accordance with the present invention is commercialized, it can be applied across all industries. For example, the nanoparticle detection system in accordance with the present invention can be used to detect dust or defect that is inevitably generated during a semiconductor process in a semiconductor industry and even find out the location or kind of the nanoscale dust or defect, and employment of such system which reduce a loss rate in the semiconductor process. Also, the nanogap device in accordance with the present invention can be introduced in medical equipments, and the reason for interest in the terahertz waves is because every cell in a human body emit light with an intrinsic wave length when an energy is given and most of which are in a terahertz range. Therefore, if it is possible to measure the terahertz wave using our system, it is possible to investigate the location or properties of each cell. In particular, since a size of most cells is 1 μm or less, nanoscale detection is should be possible for find out of the cell properties. In addition, the nanogap device can also be used in a security industry in relation to drug detection and an environmental industry in relation to pollutant detection and analysis of air.

The invention claimed is:

1. A nanogap device for electric field enhancement, comprising:

a film made of an electrically conductive material; and a nanogap formed on the film and having a gap-width between a Thomas-Fermi screening length and a skin depth, the Thomas-Fermi screening length and the skin depth being determined by an electromagnetic wave and the electrically conductive material, wherein the nanogap has a length of a half resonant wavelength of the electromagnetic wave.

2. The nanogap device of claim 1, wherein the electromagnetic wave has a wavelength in terahertz and infrared ranges.

3. The nanogap device of claim 2, wherein the electromagnetic wave is a single-cycle terahertz pulse.

4. The nanogap device of claim 1, wherein the conductive material is a metal or a carbon nanotube.

5. The nanogap device of claim 4, wherein the metal is gold.

6. The nanogap device of claim 1, wherein the nanogap has a shape of a rectangle or a slit.

7. The nanogap device of claim 1, wherein the film has a thickness of two times the gap-width of the nanogap.

8. The nanogap device of claim 1, wherein the nanogap device is used as a launching pad for terahertz nonlinearity induction, small terahertz signal detection in astronomy, nano-particle detection, or surface enhanced Raman scattering.

9. A system for nanoparticle detection, comprising:

an electromagnetic wave source for generating an electromagnetic wave; a film made of an electrically conductive material;

a nanogap formed on the film and having a gap-width between a Thomas-Fermi screening length and a skin depth, the Thomas-Fermi screening length and the skin depth being determined by the electromagnetic wave and the electrically conductive material; and a measuring means for measuring the electromagnetic wave transmitted through the nanogap.

10. The system of claim 9, wherein the electromagnetic wave has a wavelength in terahertz and infrared ranges.

11. The system of claim 10, wherein the electromagnetic wave is a single-cycle terahertz pulse.

12. The system of claim 9, wherein the conductive material is a metal or a carbon nanotube.

13. The system of claim 12, wherein the metal is gold.

14. The system of claim 9, wherein the nanogap has a shape of a rectangle or a slit.

15. The system of claim 9, wherein the film has a thickness of two times the gap-width of the nanogap.

16. The system of claim 9, wherein the nanogap has a length of a half resonant wavelength of the electromagnetic wave.

17. The system of claim 9, wherein the measuring means measures the transmission electromagnetic wave using electro-optic sampling.

* * * * *